(12) United States Patent
Furrer et al.

(10) Patent No.: US 10,133,251 B2
(45) Date of Patent: Nov. 20, 2018

(54) SAFETY CONTROLLER FOR AN ACTUATOR

(75) Inventors: Andreas Furrer, Wetzikon (CH); Martin Ochsenbein, Russikon (CH)

(73) Assignee: BELIMO HOLDING AG, Hinwil (CH)

( * ) Notice: Subject to any disclaimer, the term of this patent is extended or adjusted under 35 U.S.C. 154(b) by 1479 days.

(21) Appl. No.: 13/453,277

(22) Filed: Jun. 19, 2012

(65) Prior Publication Data

US 2013/0029580 A1 Jan. 31, 2013
US 2018/0267493 A9 Sep. 20, 2018

Related U.S. Application Data

(63) Continuation of application No. PCT/CH2010/000247, filed on Oct. 6, 2010.

(30) Foreign Application Priority Data

Oct. 22, 2009 (CH) ..................................... 1619/09

(51) Int. Cl.
*F16K 17/36* (2006.01)
*G05B 19/042* (2006.01)
*H02J 9/06* (2006.01)

(52) U.S. Cl.
CPC .......... *G05B 19/0428* (2013.01); *H02J 9/061* (2013.01); *G05B 2219/24139* (2013.01);
(Continued)

(58) Field of Classification Search
CPC ........ F24F 11/0001; F24F 13/10; H02J 9/061; G05B 19/0428; G05B 2219/2614;
(Continued)

(56) References Cited

U.S. PATENT DOCUMENTS

| 5,519,295 A | 5/1996 | Jatnieks |
| 5,744,923 A | 4/1998 | Strauss et al. |

(Continued)

FOREIGN PATENT DOCUMENTS

| CA | 2778184 A1 * | 4/2012 | .............. F24F 11/04 |
| WO | WO2011047490 A2 * | 4/2011 | .............. F24F 11/04 |

OTHER PUBLICATIONS

Swiss search report, dated Dec. 2, 2009.
Zukunftsweisende Sicherheit in Gebauden; Motorisierung von Brandschutz- und Entrauchungskiappen, p. 7, Feb. 26, 2006.

*Primary Examiner* — Gregory Huson
*Assistant Examiner* — Dana Tighe
(74) *Attorney, Agent, or Firm* — Birch, Stewart, Kolasch & Birch, LLP

(57) ABSTRACT

The invention relates to a safety controller for an actuating drive (2.1, 2.2, 2.3) for controlling a gas flow or a liquid flow in an open-loop or closed-loop manner by means of a flap (3.1, 3.2, 3.3) or a valve, in particular in the field of heating, ventilation, and air conditioning (HVAC) systems, fire-protection systems, and/or room protection systems. A safety circuit (9.1, 9.2, 9.3) is implemented to ensure the energy supply in a safety operating mode if an electricity supply circuit (8.1, 8.2, 8.3) drops off or is lost. A control value output circuit (1.1, 1.2, 1.3) detects status signals, in particular signals of a sensor (11.1, 11.2, 11.3), and/or status parameters of a system and/or a specifiable setting of an adjustment device that can be actuated manually. The safety control value is set to one of at least two different control values (SW1, SW2, . . . ) depending on the status signals so that the safety position of the flap is determined adaptively.

23 Claims, 2 Drawing Sheets

(52) U.S. Cl.
CPC ... *G05B 2219/2614* (2013.01); *Y02B 70/3241* (2013.01); *Y04S 20/227* (2013.01); *Y10T 137/1842* (2015.04)

(58) Field of Classification Search
CPC ...... G05B 2219/24139; Y02B 70/3241; Y04S 20/227; Y10T 137/1842
USPC .............. 454/229, 236, 256, 333; 137/78.1; 318/453, 479
See application file for complete search history.

(56) References Cited

U.S. PATENT DOCUMENTS

| | | | |
|---|---|---|---|
| 5,852,333 A | 12/1998 | Strojny et al. | |
| 7,586,279 B2 * | 9/2009 | Theunissen | G05B 19/042 318/444 |
| 2003/0116928 A1 | 6/2003 | Heller | |

* cited by examiner

SAFETY CONTROLLER FOR AN ACTUATOR

This application claims priority under 35 USC 120 to both PCT/CH2010/000247, filed Oct. 6, 2010 and Swiss national application CH 1619/09 filed Oct. 6, 2010.

TECHNICAL FIELD

The invention relates to a safety controller for an actuator having a setpoint output circuit which outputs a safe setpoint, which defines a safe position of the actuator, for the actuator. In particular, the safety controller is intended for an actuator having an actuating drive with a flap or a valve for open-loop or closed-loop control of a gas or liquid flow. The safety controller is preferably used in an installation for heating/ventilation/air conditioning (HLK), fire protection and/or area protection.

The invention furthermore relates to an installation having a safety controller such as this and to a method for operation of an installation.

PRIOR ART

So-called actuating drives are used to adjust flaps or valves in a ventilation or water-pipe system and therefore for closed-loop control of an air or water flow, with relatively low-power electric motors driving the flaps or valves, and/or the closed-loop control members, via a step-down transmission. The flap is pivoted or the ball valve of a valve is rotated with high precision over numerous revolutions of the driveshaft of the electric motor.

For safety reasons, during operation of a ventilation or water-pipe system it is necessary for the gas or liquid volume flow to be interrupted in the event of an electrical power failure, in order to prevent damage to buildings or to people, that is to say the flaps or valves of the ventilation or the water-pipe system are closed.

This can be done using a return spring which is stressed by the electric motor during opening of the flap or the valve. In the event of an electrical power failure, there is no power from the electric motor, in response to which the flap or the valve is closed by the force of the return spring.

As is disclosed in WO 2007/134471 (Belimo), an electrical safety circuit can be provided, by means of which a capacitor is charged when the electrical power supply is present. The safety circuit is designed to use the energy stored in the capacitor to close the flap or the valve in the event of an electrical power failure. The voltage or the capacitance can be increased by arranging a plurality of capacitors connected in series or in parallel.

US 2005/127854 (Siemens Corp.) discloses a controller for a failsafe drive for a ventilation flap or a valve in an HLK system. The valve can be moved to an open, closed or mid position in the event of an electrical power failure. The energy to move the valve to the desired position is provided by a capacitance. The use of an electrical drive and of a capacitance makes it possible to move to a final position or else to a mid-position by simple configuration in the event of an electrical power failure. This is impossible in the case of a spring. In comparison to the battery, the capacitance store has the advantage of being less technically complex and of being more reliable.

U.S. Pat. No. 5,744,923 (National Environmental Products) discloses an air-flap drive which is moved to a safe position in the event of an electrical power failure. A "soft landing" controller is provided in order to prevent the drive, which is operated by the capacitance, from moving to the safe position without being braked. In the safe position, the flap can assume an open, closed or mid position, depending on what is preset by the installation designer.

The setting of flaps or valves to an open, mid or closed position in the event of an electrical power failure regulates a volume flow in a ventilation or water-pipe system to a predetermined value. If the electrical power failure is associated with a fire in which a large amount of smoke gas is developed, smoke gases can no longer be carried away via the ventilation system when the flaps are closed. In contrast, closed flaps are advantageous in order to prevent the fire from propagating along a ventilation system when a fire and an electrical power failure occur at the same time. The regulation of the volume flow to a predetermined value in the event of an electrical power failure therefore does not always lead to the optimum result, and can even, in contrast, lead to increased damage to buildings and people.

DESCRIPTION OF THE INVENTION

The object of the invention is to provide a safety controller which is associated with the technical field mentioned initially, can be used more flexibly in the event of occurrences such as an electrical power failure, and keeps the damage to buildings or people as minor as possible.

The object is achieved by the features of claim 1. According to the invention, a setpoint output circuit is provided which outputs a safe setpoint, which defines a safe position of the actuator, for the actuator. The setpoint output circuit has at least one input for a variable state signal and is designed to set the safe setpoint to one of at least two different setpoints as a function of said state signal.

The invention is therefore based on the idea of fixing the safe position as a function of specific signals. The safe position is therefore no longer predetermined in a fixed manner, but is fixed adaptively corresponding to states which change over the course of time, for example of the environment, the installation or the drive. A signal which can be detected physically (and is converted to electrical or electronic form) is preferably known by the term state signal. However, a state signal may also be produced from variables which are controlled or monitored in the installation. It is important that the state signal can be passed to the setpoint output circuit automatically.

The setpoint output circuit contains logic (in the form of a digital circuit), a data processing program which can be run in a controller, or the like) which outputs a safe setpoint, which can assume at least two different values, on the basis of the at least one input-side state signal and possibly further parameters. The permissible values may, for example, correspond to the "open" and "closed" safe position, or else to an intermediate "half-open" position.

Preferably, the safety controller comprises a controller, which comprises an input for a voltage drop signal or a detector for a voltage drop of an external current feed circuit and has a safety mode in which, in the event of a predetermined voltage drop, the actuator is moved with the aid of an electrical energy store, in particular a capacitive energy store, to the safe position which corresponds to the safe setpoint which is output by the setpoint output circuit. The controller is typically integrated in an electronic component, which is equipped with a microprocessor and all the normal inputs and outputs, in order, for example, to monitor the power supply of a drive and in order to supply the drive with power from a capacitor store, if the supply voltage fails (cf.

WO 2007/134471). This allows the widely used functional units to be provided with additional monitoring characteristics, which need not be predetermined in a fixed form, but can be used and/or activated as required (that is to say adaptively).

However, the safety controller may also be accommodated in a separate electronic component, or may be implemented in a central controller for an installation, in the form of a subroutine in a larger computer program.

It is particularly preferable for the safety controller (that is to say the at least one input for the variable state signal) to be connected to a sensor, such that the safe setpoint is fixed to one of the at least two different setpoints, as a function of a signal from the sensor. Depending on the complexity of the installation and the requirements for the safety controller, it may be useful to attach two, three or more sensors to the safety controller.

The sensor signal relates, for example, to a temperature measurement or a smoke measurement. Depending on the location of the flap or of the valve which has been provided with open-loop or closed-loop control by the actuating drive, it may be desirable to move the flap or the valve to a specific position, that is to say for example to a position in which the flap or the valve is 10% open, in the event of a specific temperature or smoke development, with an electrical power failure at the same time.

A very high temperature measurement and a small amount of smoke being developed may therefore necessitate the flap or the valve being completely or partially closed in the event of an electrical power failure, in order to prevent the propagation of a fire with a small amount of smoke gas being developed, and to optimally protect against damage to buildings or people.

On the other hand, a large amount of smoke development may require the flap or the valve to be completely or virtually completely opened, in order to ensure optimum dissipation of smoke gases and ventilation of areas.

In the event of an electrical power failure or cut, which may occur in the event of a fire in a building because of destruction or the influence of extinguishing water, the power supply for the actuating drive in the safety mode is delivered via the safety circuit and the flap or the valve may be moved to that position which keeps the damage to people or buildings as small as possible in an existing danger situation.

During normal operation, power is supplied to the actuating drive via the current feed circuit, while in the safety mode power is supplied via the safety circuit.

The sensor signal may be detected continuously or at definable times, in order to readjust the actuating parameter in accordance with instantaneous measured values, such that the required actuating parameter has already been determined in the event of a power failure or cut.

According to a further variant, a manually operable adjusting apparatus is connected to the input for the state signal, such that the safe setpoint is fixed as a function of an instantaneous position of the adjusting apparatus. For example, an actuating wheel, an actuating screw or one or more toggle switches may be provided for this purpose. This can be done in particular during the installation of an actuating drive. By way of example, partial opening may be desirable for a flap which controls the exhaust air flow for an area, or complete closure may be required for a flap which controls the air flow between two buildings. The manually operable adjusting apparatus may be fitted directly to the housing of the drive or to the electronic power supply. However, it is also feasible for the control elements (rotary knob etc.) to be provided at a distance from the ventilation flap, for example some meters away, at a highly accessible location.

The logic which is used to determine the safe setpoint as a function of the detected state signals depends on the specific circumstances of the use of the ventilation flap and/or of the installation which controls the ventilation flaps. In general, the logic will operate on the threshold-value principle. This means that the normal safe setpoint value corresponds to the closed valve position, but that, if a state signal exceeds a predetermined threshold value, a different safe setpoint is output which, for example, corresponds to the open or half-open valve position. It is also possible to combine a plurality of threshold values for different state signals and for a setpoint which differs from the normal safe setpoint to be output only if a plurality of state signals exceed the setpoint respectively intended for them.

A further advantageous embodiment variant consists of an installation parameter module being connected to the input for the state signal. Said installation parameter module provides state parameters for the entire HLK installation (with its multiplicity of ventilation flaps), such that the safe setpoint is fixed as a function of at least one parameter value of the installation control unit. By way of example, the extent of the electrical power failure (total or partial), the number of active fans, the number of currently closed or open ventilation flaps, the currently active season-specific operating program, etc., may be used as installation parameters.

The installation parameter module is in general provided in the central control unit. However, it may also be installed in a decentralized form (for example for a local group of valves). If the safety controller is integrated in the capacitive electrical power supply, the contact with the installation parameter module is made via a data transmission interface.

In relatively small installations, in which the electrical power supply either fails completely or not at all, for example, there is no need to use installation parameter values. The state signals which are provided by the installation parameter module are in general not based on sensor values. However, this does not preclude use being made of monitoring sensors for the installation controller in order to determine the installation parameters.

A parameter of the current feed circuit, of the electrical energy store and/or of an operating state of an adjacent system component, such as, for example, a system fan for a heating/ventilation system may also be used as a state signal, in order to determine the actuating parameter and/or to select the safety mode, on the basis of the sensor signal therefrom.

Depending on whether or not a fan is still in operation in a ventilation pipe, the flap can be set to a minimum position, or can be closed completely. An electrical parameter of an electrical energy store, that is to say for example a decrease in electrical voltage, may indicate a decreasing capacitance of the electrical energy store or excessive aging and, in this case, the flap or the valve can be set to a position matched to the location as a precaution.

A further option for use of the adaptive safety controller is to provide a data interface for access to a server, and for the safe setpoint to be fixed as a function of at least one parameter value of the server. By way of example, the server may be accessible via the Internet, and storm warnings or weather forecast data may be made available.

Preferably, the safety circuit comprises an electrical energy store, in particular a capacitive energy store. The controller is then typically integrated in a microprocessor for controlling the energy store. In other words, the safety circuit according to the invention is installed in a switching unit according to WO 2007/134471. However, the electrical energy store may also be formed by a rechargeable battery, or by some other electrical energy store.

The safety circuit, the capacitive energy store, a detector for a voltage drop of an external current feed circuit and a controller are therefore preferably in the form of a physical unit, which can be electrically connected and mechanically coupled as an entity to an actuating drive (for example accommodated in a separate housing) ("piggyback arrangement").

In one circuit variant, power is also supplied by the electrical energy store when not in the safety mode, that is to say during normal operation, with this energy store being continuously recharged by the current feed circuit.

Alternatively, the safety circuit comprises a mechanical energy store such as a spring or a flywheel, for example. The mechanical energy can either be transmitted directly to the flap or the valve, in particular in the case of the spring, or the mechanical energy may be converted to electrical energy, particularly in the case of the flywheel. If the mechanical energy is transmitted directly, electrically operable blocking means may be provided, in order to define the flap or valve position in the safety mode.

The safety circuit may also be integrated in the drive controller. If the normal electrical power supply fails, the drive knows its safe position and is moved to the desired position provided that it is supplied with power from, for example, the capacitive energy store. The capacitive energy store can also be accommodated with the drive controller in a common housing, thus providing one physical unit (specifically a so-called integrated actuator), which can be used in a versatile manner.

A controller and/or a central computer are/is preferably provided in order to detect at least one sensor signal and to determine the actuating parameter.

The controller and/or the central computer have/has a digital processor for processing of programs (software modules), as well as analog or digital interfaces such as analog/digital converters or a bus interface, in order to detect the sensor signals and to supply them to the digital processor.

The software modules evaluate the detected sensor signals on the basis of specific criteria and fix the actuating parameter which is transmitted, for example, via a digital interface to a motor controller for the actuating drive. Particularly in the case of the controller, an actuating drive can cost-effectively be equipped with a safety controller.

The sensors are associated with a data transmission module in order to transmit sensor signals to the controller or to the central computer. Wire-based and/or wire-free data transmission modules may be provided, which are known in the prior art in accordance with various standards, such as USB, Ethernet, Bluetooth or Wireless LAN.

Since a sensor identification is transmitted at the same time during the data transmission, the actuating parameter can be fixed on the basis of a location table of the sensors and the currently measured sensor signals and can be adapted to a current environment, with this then being transmitted via a further data link to an actuating drive. A multiplicity of sensors and actuating drives may be provided in one building. Since the building structure, the installation of water pipes and ventilation pipes as well as the sensors and actuating drives in the building can be detected electronically, various scenarios can be calculated through for given measured values of the sensors, that is to say in particular a propagation scenario for a fire and for the smoke gases for different flap and valve positions, and optimum actuating parameters can be defined from the calculated scenarios.

Preferably, at least one sensor is integrated in the actuating drive, and/or at least one sensor is arranged externally from the actuating drive.

Sensors which are integrated in the actuating drive have the advantage that no data transmission apparatuses need be arranged, for example a cable, between the sensors and the actuating drive. This simplifies the fitting of the actuating drive.

In contrast, sensors which are arranged externally from the actuating drive have the advantage that a larger surrounding area can be monitored, and changes in the surrounding area which are relevant for an actuating drive can be identified earlier. The use of external sensors also allows a modular system concept. Different sensors can be connected to a safety controller as required. Sensors may also be replaced or interchanged more easily.

Preferably, at least one sensor is provided for detection of chemical and/or physical measured values, with the sensor in particular being a gas sensor, a smoke sensor, a temperature sensor, an air pressure sensor and/or a flow sensor, in order to determine the actuating parameter and/or to select the safety mode on the basis of its sensor signal.

Sensors such as these allow the dynamics of a (possible) fire in a building to be predicted very precisely and (if such a fire occurs) to be detected and tracked, thus allowing actuating parameters for actuating drives to be defined more precisely. In particular, the outside temperature and the inside temperature of a building can also be taken into account, and these can significantly influence the dynamics.

The determination module is preferably designed to dynamically determine the actuating parameter, in particular after a definable time interval has elapsed or on the basis of detected sensor signals. In the event of an electrical power failure, an actuating parameter is therefore determined which corresponds optimally to the current situation in a building, thus minimizing damage to people or buildings.

During normal operation, electrical power is supplied to the actuating drive and to the controller via the current feed circuit. In the safety mode, the safety circuit takes over the electrical power supply for the actuating drive and the controller. Until an electrical power supply failure occurs, the various sensor signals can therefore be detected and evaluated in order to determine the actuating parameter, for example regularly after a time interval has elapsed. Readjustment of the actuating parameter and therefore the flap or valve position can be continued if required for as long as the electrical energy store is sufficient to supply current to the controller and the actuating drive. An optimal flap position to prevent damage to people or buildings can thus be ensured over a relatively long time period.

The actuating parameter can be defined when the safety mode is initiated. This ensures that the flap is set on the basis of a current danger situation.

A time module is preferably provided, in order to determine the actuating parameter as a function of time, in particular as a function of the time of day, the day of the week and/or the season. Hence, for example, it may be necessary to set different actuating parameters in a factory hall with a machine workshop during daytime operation or during nighttime and/or weekend operation since, for example, the closing of flaps when machines are being operated fully during the daytime may lead to overheating of the machine workshop, and therefore to an increased risk of fire. During a typically dry season, such as the autumn, it may also be necessary to determine the actuating parameters such that spreading to a secondary building must be accepted rather than to a nearby wood, in order to minimize the damage to people or buildings, since surrounding villages may be endangered by a wood fire.

According to a further embodiment variant, the safety controller has a delay circuit in order to change to the safety mode only after a (predetermined) delay time has elapsed in the event of absence or failure of the current feed circuit. The delay time may be a multiple of the normal reaction time, for example at least one second. Brief electrical power supply voltage dips of up to a few seconds may be bridged without the safety mode being selected and the flaps being unnecessarily repositioned. Alternatively, the safety controller may be designed to select the safety mode immediately when the event occurs, with a reset apparatus which can be operated manually being provided in order to reset the safety controller from the safety mode to normal operation. At the same time, it is possible to confirm that the flap position has been set correctly. This is necessary in particular when the functionality of the safety controller is monitored in a situation which leads to the safety mode.

The invention allows functional flexibility for existing installations for open-loop and/or closed-loop control of heating/ventilation/air conditioning (HLK) and/or for fire protection and/or area protection. This requires at least one actuating drive (preferably a plurality) and a flap or a valve driven thereby for open-loop or closed-loop control of a gas or liquid flow (or a plurality of flaps or valves). The safety controller according to the invention, of the type described above, can be accommodated in the actuating drives, in the safety circuits or else in the installation central controller. In particular, mixed models are possible, in which, for example, certain drives have an integrated safety controller, but others do not. Likewise, certain safety circuits (which are provided for supplying power locally in the event of an electrical power failure) may have a safety controller of the type according to the invention, and others may not. In addition, the safety controller may be integrated directly in the central installation controller.

At least one sensor is preferably provided externally from the actuating drive in the installation, and its signal is also taken into account for fixing the safe setpoint according to the invention.

Particularly if the safety controller is accommodated in the central installation controller, it is very simple to connect an output of the installation parameter module to an input of the safety controller, such that the safe setpoint is fixed as a function of at least one installation parameter value. This may be a pressure value, a temperature value, a flow value or else a calculated value.

The invention can also be implemented by a method for operation of an installation for open-loop and/or closed-loop control of heating/ventilation/air conditioning (HLK) and/or for fire protection and/or area protection having the following steps:
a) detection of a state signal;
b) fixing of the safe setpoint as a function of the state signal to one of at least two different setpoints;
c) detection of absence or failure of a current feed and
d) if required, initiation of a safety mode, in which the actuator is moved to a safe position, corresponding to the safe setpoint.

If an (optional) time delay module of the type described further above is provided, it is possible for the safety mode not to be necessarily initiated, or not to be initiated in all cases but only when required (that is to say when the delay time has elapsed before the correct electrical power supply via the mains system is running again).

Preferably, the state signal is detected and the safe setpoint is fixed during normal operation of the installation. This ensures that the installation can change to the safety mode by means of a simple and reliable method process in the event of an electrical power failure.

If the safe position of the valve or of the flap is intended to depend on parameters which are actually provided in the event of an electrical power failure, then it is necessary to determine the corresponding parameters in real time, and to calculate or to determine the safe setpoint from them.

Preferred embodiments of the method will become evident from one or more of the embodiments of the safety controller described above.

The invention may also be implemented in the form of a computer program product, that is to say software which carries out the described method when it is loaded in a central computer or in a microprocessor of a safety circuit or of a drive controller.

Further advantageous embodiments and feature combinations of the invention will become evident from the following detailed description and the totality of the patent claims.

BRIEF DESCRIPTION OF THE DRAWINGS

In the schematic drawings which are used to explain the exemplary embodiment.

In principle, the same parts are provided with the same reference symbols in the figures.

Approaches to Implementation of the Invention

The embodiment of the invention described in the following text relates to a flap for controlling a gas flow in a ventilation channel. It can be transferred directly, and used analogously, to and for a valve for controlling a liquid flow in a liquid pipe. An apparatus for controlling an air flow is known from EP 2 052 191 (Belimo). A ball valve for controlling a liquid flow is known, for example, from EP 1 924 793 (Belimo). Installations and apparatuses such as these can be provided with the controller according to the invention.

The flap 3 is arranged within the ventilation channel 4 and, for example, can rotate about an axis, such that the gas flow in the ventilation channel 4 can be restricted by rotation of the flap 3. Depending on the position, the flap 3 can entirely release the gas flow in the ventilation channel 4 or can partially to entirely suppress it, that is to say the flap 3 can be adjusted from a maximum opening of 100% to complete closure. This makes it possible to adjust the air flow in a heating or ventilation system, in order to control the supply or extraction of, for example, fresh air, hot air or exhaust air.

The modules mentioned in the following text may in general be in the form of integrated components, that is to say ASICs, or in the form of a software program which can run on a processor.

Figure 1:
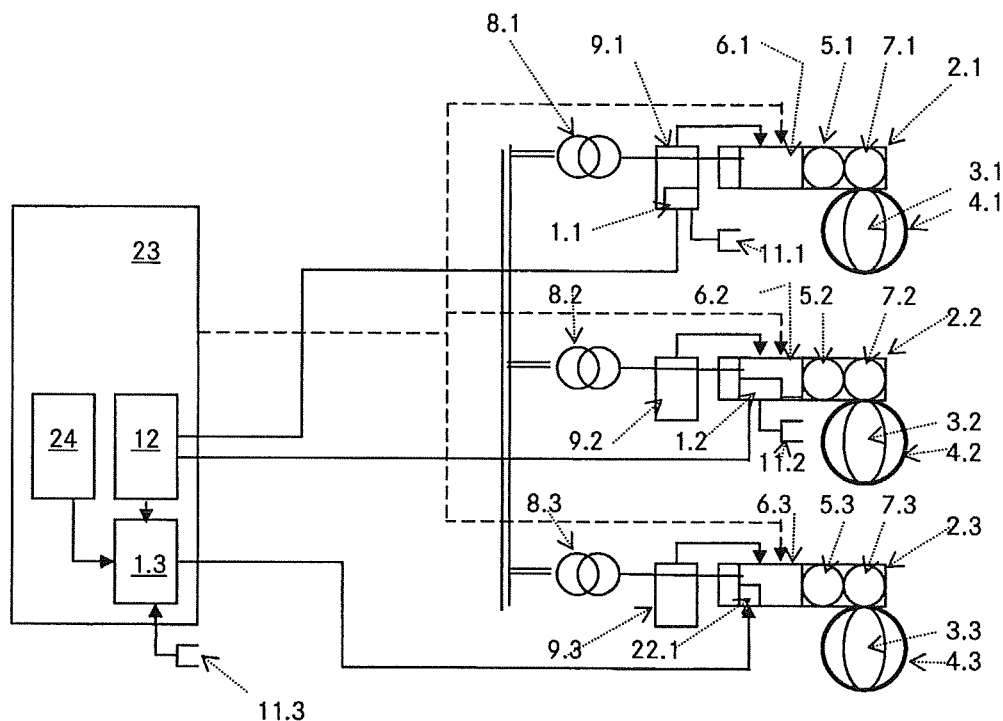
FIG. 1 shows an HLK installation with a safety controller according to the invention.

FIG. 1 shows a circuit diagram of an HLK installation having a plurality of ventilation channels 4.1, 4.2, 4.3, in which the through-flow of air is monitored and controlled by flaps 3.1, 3.2, 3.3 in a form known per se. The flaps 3.1, 3.2, 3.3 are operated by a respective actuating drive 2.1, 2.2, 2.3. Each actuating drive 2.1, 2.2, 2.3 comprises a respective electric motor 5.1, 5.2, 5.3 and a step-down transmission 7.1, 7.2, 7.3. The motor controls 6.1, 6.2, 6.3, which are preferably accommodated with the electric motor and transmission in a common housing, are electrically connected to a current feed circuit 8.1, 8.2, 8.3, which circuits are attached to the general power supply system and, during normal operation, provide the electrical power for operation of the actuating drives 2.1, 2.2, 2.3. A safety circuit 9.1, 9.2, 9.3 is respectively inserted between the current feed circuit 8.1, 8.2, 8.3 and the actuating drive 2.1, 2.2, 2.3 and provides the necessary spare energy to move the flap to the safe position in the event of an electrical power failure or power cut of the current feed circuit 8.1, 8.2, 8.3. The safety circuits 9.1, 9.2, 9.3 can be designed subject to matching according to the invention (as is indicated at 9.3 in FIG. 1 and as explained in the following text), as described in WO 2007/134471.

An installation control unit 23 is provided for open-loop and closed-loop control during normal operation and is connected for control purposes to the motor controller 6.1, 6.2, 6.3 (dashed line).

FIG. 1 shows three different embodiment variants of the invention. In a first variant, the setpoint output circuit 1.1 is accommodated in the safety circuit 9.1. As can be seen from FIG. 1, the setpoint output circuit 1.1 can be connected to an installation parameter module 12, which is integrated in the central installation control unit 23, and to a local sensor 11.1. The setpoint output circuit 1.1 in this example therefore has two inputs, to which state signals (installation parameter values, sensor values) are supplied.

In a second variant, the setpoint output circuit 1.2 is integrated in the motor controller 6.2. In this case as well, a signal from a sensor 11.2 is provided as a further input. In this variant, the safety circuit 9.2 may be designed conventionally.

In the third variant, the setpoint output circuit 1.3 is contained in the central installation control unit 23. The sensor 11.3, whose signal is used to determine the safe setpoint, is connected to the installation control unit 23 and, to be precise, to the setpoint output circuit 1.3. The motor controller 6.3 has only one local safe setpoint memory, which can be accessed in the event of an electrical power failure. The setpoint output circuit 1.3 produces the current safe setpoint (with the previously stored value being deleted), for example at regular time intervals. In the event of an electrical power failure, the data link to the central installation control unit 23 does not need to be functional, since the safe setpoint memory 22.1 in fact contains the most recently transmitted safe setpoint.

If the supply voltage collapses and the safety circuits 9.1, 9.2, 9.3 detect this and pass on the signal for the safety mode, then each motor controller 6.1, 6.2, 6.3 moves the respectively associated flap 3.1, 3.2, 3.3 to the safe position, which is given by the safe setpoint. The three schematically illustrated flaps 3.1, 3.2, 3.3 do not need to be moved to the same safe position.

Figure 2:
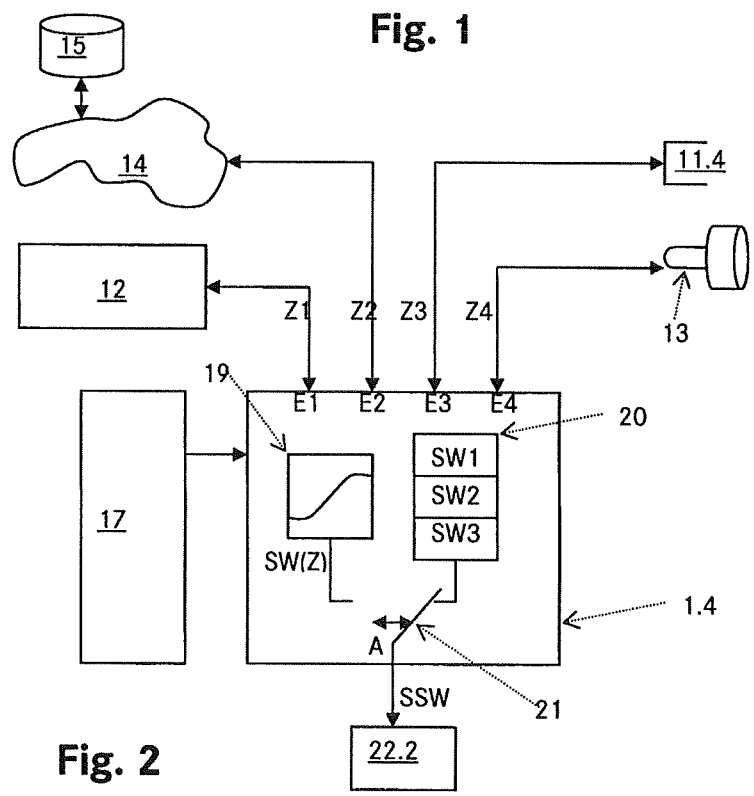
FIG. 2 shows a safety controller for a plurality of state signals.

FIG. 2 shows one possible embodiment of a safety controller 1.4 according to the invention.

By way of example, four inputs E1, . . . , E4 are provided for state signals Z1, . . . , Z4. The state signal Z1 is produced, for example, by the installation parameter module 12. The state signal Z2 is transmitted, for example via the data network 14 (Internet, Intranet) from a server 15. The state signal Z3 is produced, for example, by a sensor 11.4, and the state signal Z4 is obtained by checking the manually adjustable potentiometer 13.

Depending on the configuration of the safety controller 1.4, the state signals Z1, . . . , Z4 are passed to a calculation module 19 or to a table module 20. These two modules use an application-specific algorithm to determine the safe setpoint SSW, either by using a specific formula SW(Z) to calculate a value or by reading a value from a table SW1, SW2, SW3 on the basis of specific criteria.

A selector 21 can be provided, which is set such that the calculated value as safe setpoint or the value read from the table is output at the output A, depending on the requirements. (In general, either a calculation module 19 or a table module 20 is provided, and the selector 21 is superfluous). The safe setpoint SSW is stored in a safe setpoint memory 22.2.

FIG. 2 also shows a time module 17 which is used to initiate a check of the state signals at a specific (preprogrammed or periodic) time.

Figure 3:
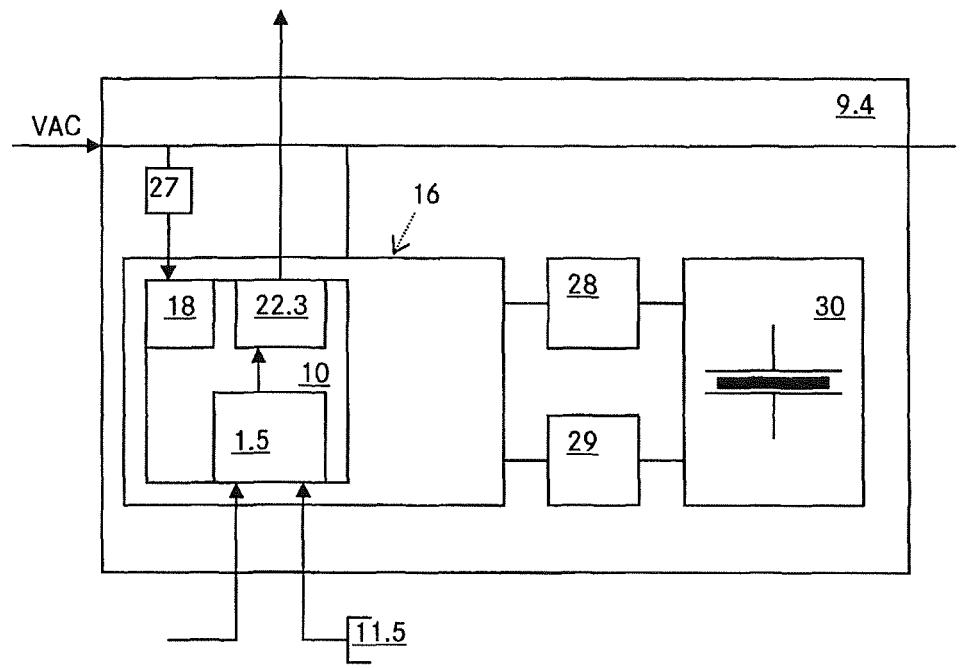
FIG. 3 shows a safety circuit with a capacitive energy store and a safety controller.

FIG. 3 shows an outline of a safety circuit 9.4 which is obtained by variation or adaptation according to the invention of the circuit arrangement according to WO 2007/134471.

A microprocessor 16 controls an energy converter 28 and a monitoring unit 29 of a capacitive energy store 30 (with one or more supercaps). This means that the microprocessor 16 ensures that the energy store 30 is in the charged state during normal operation. If the normal power supply voltage falls, the microprocessor 16 ensures that the current from the capacitive energy store 30 is supplied to the actuating drive 2.1 (FIG. 1), thus allowing the flap to be moved to the stored safe position.

A detector 27 for the voltage drop is connected to the microprocessor 16. When this detector 27 responds, the delay module 18 (which is provided in the sense of an embodiment variant) is activated. If the signal for the voltage drop remains for a predetermined duration $T_0$ (for example 5 seconds), the controller 10 then becomes active, initiating the safety mode. If the electrical power failure duration is shorter than the predetermined duration $T_0$, the controller 10 remains in normal operation.

In the safety mode, the controller transmits the safe setpoint SSW, which is stored in the safe setpoint memory 22.3, to the motor controller, and transmits the energy contained in the capacitive energy store 30 in order to allow the motor controller to carry out the received command and to move the flap to the safe position.

According to one embodiment variant, it is also possible for the setpoint output circuit 1.5 not to determine the safe setpoint SSW until the controller 10 changes to the safety mode. The signal from the sensor 11.5 and possibly a further state signal are/is then used to calculate the safe setpoint.

The current feed circuit 8.1, 8.2, 8.3, for example a 230 V or 110 V AC mains power feed or a 24 V or 72 V AC or DC power feed, may be arranged directly adjacent to the actuating drive 2.1, 2.2, 2.3 or may be arranged centrally in the building in which the heating or ventilation installation is installed.

Sensor signals may be transmitted from the sensors to the central computer in particular via digital communication links, such as an Ethernet or Wireless LAN. In principle, it is also feasible to use a unidirectional digital data link, either cable-based or wire-free, in order to transmit the measured sensor values to the central computer.

The central computer may be formed by any computer system and may comprise a detection module and a determination module, in order to determine the safe setpoint based on sensor signals or installation parameters. A fire propagation module 24 may be provided, in order to estimate the propagation of a fire or of the flue gas, by calculating these various scenarios, on the basis of an electronically recorded building description, that is to say in particular on the basis of the area geometry and the arrangement of the ventilation installation. Once the sensors have determined that there is a current fire situation, it is possible, for example in a first, second and third scenario, to assume the safe setpoint of the actuating drive 2.1 to be completely closed, half open or entirely open, and to assume the remaining actuating drives 2.2, 2.3 to be completely closed, with the propagation of the fire and of the smoke gases being determinable by calculation by the fire propagation module 24 for future time intervals. In further scenarios, the actuating drives 2.2, 2.3 can likewise be assumed to be successively half-open or entirely open, with the fire propagation being determined by the fire propagation module 24. Finally, from the scenarios determined in this way, that having the least damage to be expected to people or buildings is chosen, and the safe setpoints of the actuating drives 2.1, 2.2, 2.3 are fixed accordingly.

The central computer may furthermore comprise a time module in the sense of the embodiment in FIG. 3.

Figure 4:
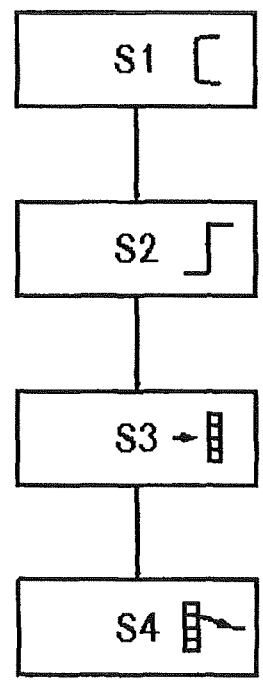
FIG. 4 shows a flowchart for definition of an actuating parameter.

FIG. 4 schematically illustrates a flowchart of a software module with the most important steps for fixing the safe setpoint. As mentioned, this can be done during normal operation and, once new sensor signals from the sensors 11.1, 11.2, 11.3 have been recorded at a recording time, this can be done as the safety mode is commenced (that is to say started), or this can be done at a recording time after the start of the safety mode.

In step S1, sensor signals from the sensors 11.1, 11.2, 11.3 are detected by the setpoint output circuit 1.4 (FIG. 2), and are stored in a main memory of the microprocessor. The sensor signals can be recorded virtually continuously, by recording them at a high sampling frequency of, for example, several 100 Hz. For many applications, it is sufficient to store the sensor signals at time intervals of several minutes or hours. The storage may relate only to the most up-to-date value, or a time series can be recorded in the table structure.

In step S2, the stored sensor signals are evaluated in order to determine the safe setpoint. A future development of the sensor signals, and therefore damage to buildings and people, can also be estimated. If a sensor signal exceeds a threshold value that is stored in a comparison table, that is to say for example a temperature measurement indicates a high level of heat, then this may require specific actuating drives 2.1, 2.2, . . . , 2.3 to be set to a closed or predominantly closed position during the initiation of the safety mode, in order to prevent the propagation of a fire. By way of example, the future development of the sensor signals can be calculated in order to determine the position to which the flap should be set, that is to say whether, for example, an opening of 10% or one of 70% should be set.

In step S3, the safe setpoints of the various actuating drives are stored, for example, using a vector structure.

In step S4, the safe setpoints of the vector structure are transmitted to the individual actuating drives 2.1, 2.2, 2.3. This is preferably done immediately after the said values have been determined, such that updated values are always available in the actuating drives.

In summary, it can be stated that the safety controller according to the invention can be used for events such as an electrical power failure, and keeps the damage to buildings or people as minor as possible.

The invention claimed is:

1. A safety controller for an actuator, said actuator having an actuating drive with a flap or a valve for open-loop or closed-loop control of a gas or liquid flow, said actuator being for use in an installation for heating/ventilation/air conditioning (HVAC), fire protection area protection, said safety controller comprising:
   a setpoint output circuit which outputs a safe setpoint which defines a safe position of the actuator, for the actuator,
   the setpoint output circuit including at least one input for a variable state signal, and being designed to set the safe setpoint to one of at least two different setpoints as a function of said state signal.

2. The safety controller as claimed in claim 1, further comprising:
   a controller, which comprises an input for a voltage drop signal or a detector for a voltage drop of an external current feed circuit and has a safety mode in which, in the event of a predetermined voltage drop, the actuator is moved with the aid of an electrical energy store to the safe position which corresponds to the safe setpoint which is output by the setpoint output circuit.

3. The safety controller as claimed in claim 2, further comprising:
   a capacitive energy store, wherein the controller is integrated in a microprocessor for controlling the energy store.

4. The safety controller as claimed in claim 2, further comprising:
   a drive controller.

5. The safety controller as claimed in claim 1, further comprising:
   a sensor which is connected to the at least one input for the variable state signal such that the safe setpoint is fixed to one of the at least two different setpoints as a function of a signal from the sensor.

6. The safety controller as claimed in claim 5, wherein the sensor is a gas sensor, a smoke sensor, a temperature sensor, an air-pressure sensor and/or a flow sensor.

7. The safety controller as claimed in claim 1, wherein an installation parameter module is connected to the input for the state signal such that the safe setpoint is fixed as a function of at least one parameter value of an installation control unit.

8. The safety controller as claimed in claim 1, wherein a manually operable adjusting apparatus is connected to the input for the state signal, such that the safe setpoint is fixed as a function of an instantaneous position of the adjusting apparatus.

9. The safety controller as claimed in claim 1, further comprising:
   a data interface for access to a server, wherein the safe setpoint is fixed as a function of at least one parameter value of the server.

10. The safety controller as claimed in claim 1, wherein a time module is provided in order to determine the safe setpoint as a function of time.

11. The safety controller as claimed in claim 1, further comprising:
   a delay circuit in order to change to the safety mode only after a delay time has elapsed in the event of absence or failure of the current feed circuit.

12. An actuator having an actuating drive for positioning of a flap or of a valve for open-loop or closed-loop control of a gas or liquid flow for use in an installation for heating/ventilation/air conditioning (HVAC), fire protection or area protection, comprising a safety controller as claimed in claim 1.

13. A safety circuit having a capacitive energy store, a detector for a voltage drop of an external current feed circuit and a controller, comprising a safety controller as claimed in claim 1.

14. An installation for open-loop or closed-loop control of heating/ventilation/air conditioning (HVAC) or for fire protection and/or room protection, having at least one actuating drive and a flap, which is driven thereby, or a valve for open-loop or closed-loop control of a gas or liquid flow, comprising a safety controller as claimed in claim 1.

15. The installation as claimed in claim 14, further comprising at least one sensor externally from the actuating drive.

16. The installation as claimed in claim 14, wherein an installation parameter module is connected to the input for the state signal, such that the safe setpoint is fixed as a function of at least one installation parameter value, with the at least one installation parameter value being, in particular, a pressure value, a temperature value, a flow value.

17. A method for operation of an installation for open-loop or closed-loop control of heating/ventilation/air conditioning (HVAC) or for fire protection or area protection having the following steps:
  detecting a state signal and sending the detected state signal to a microprocessor;
  fixing of a safe setpoint, which defines a safe position of an actuator, as a function of the state signal to one of at least two different setpoints;
  detecting absence or failure of a current feed circuit by a detector and sending the detected absence or failure of the current feed circuit to the microprocessor, and
  if required, based on the detected absence or failure of the current feed circuit, initiating a safety mode by the microprocessor, in which the actuator is moved to the safe position, corresponding to the safe setpoint.

18. The method as claimed in claim 17, wherein the state signal is detected and the safe setpoint is fixed during normal operation of the installation.

19. The method as claimed in claim 17, wherein the state signal consists of at least one installation parameter value.

20. The method as claimed in claim 17, wherein the safe setpoint is determined as a function of time.

21. The method as claimed in claim 17, wherein a plurality of sensor signals are detected by sensors, which are arranged within or externally from an actuating drive.

22. The method as claimed in claim 17, wherein, in the event of absence or failure of the current feed circuit, the safety mode is initiated only when the absence or failure remains throughout a predetermined minimum time interval.

23. A non-transitory computer readable storage medium comprising instructions which, when executed by a computer, cause the computer to carry out the method as claimed in claim 17.

* * * * *